June 7, 1966
W. H. GLAZIER ETAL
3,254,835
OPTICAL FILTER
Filed Dec. 19, 1963
2 Sheets-Sheet 1
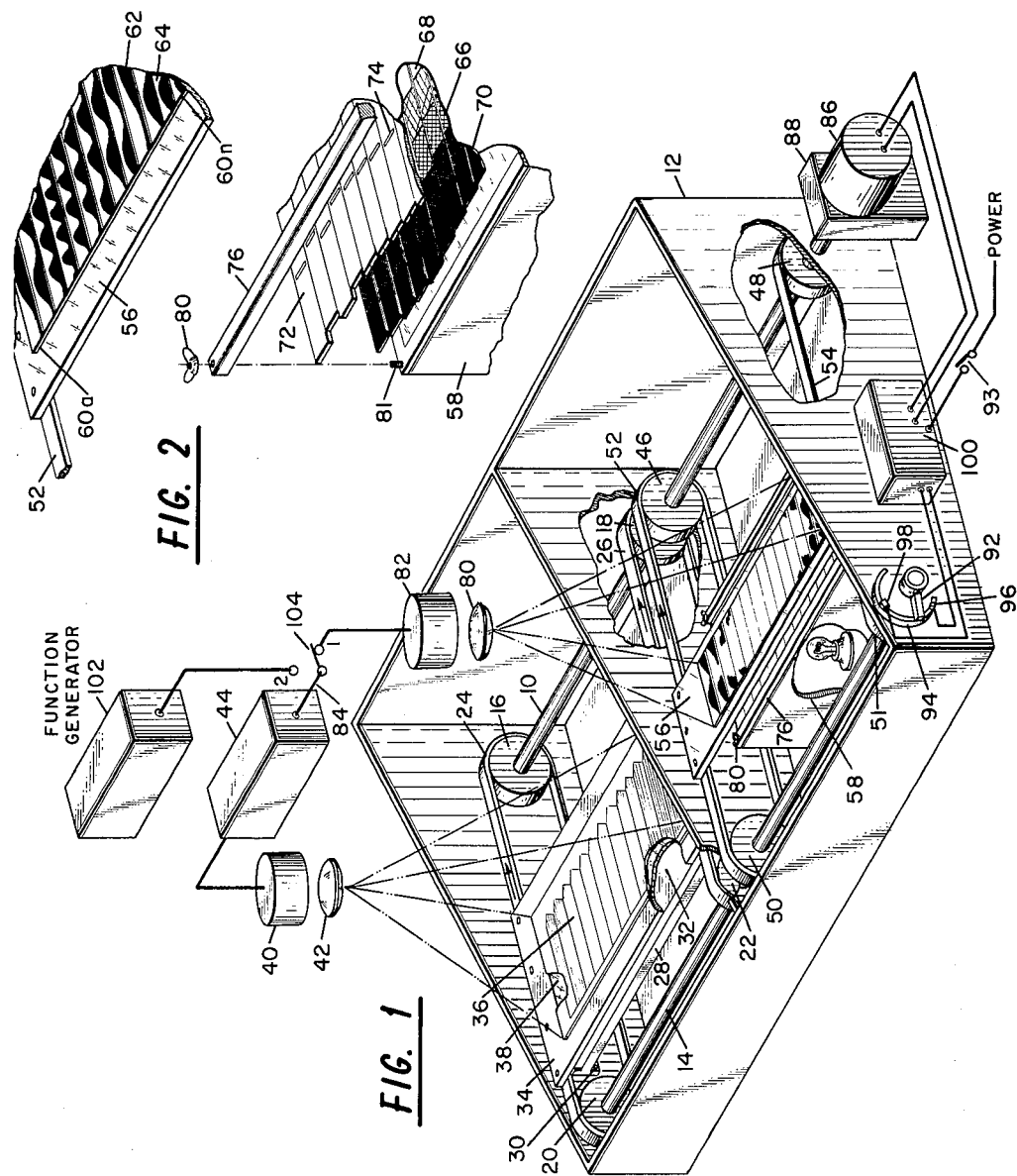
Walter H. Glazier
Harland H. Heffring
INVENTORS.
BY John D. Gassett
ATTORNEY June 7, 1966 W. H. GLAZIER ETAL 3,254,835
OPTICAL FILTER
Filed Dec. 19, 1963 2 Sheets-Sheet 2
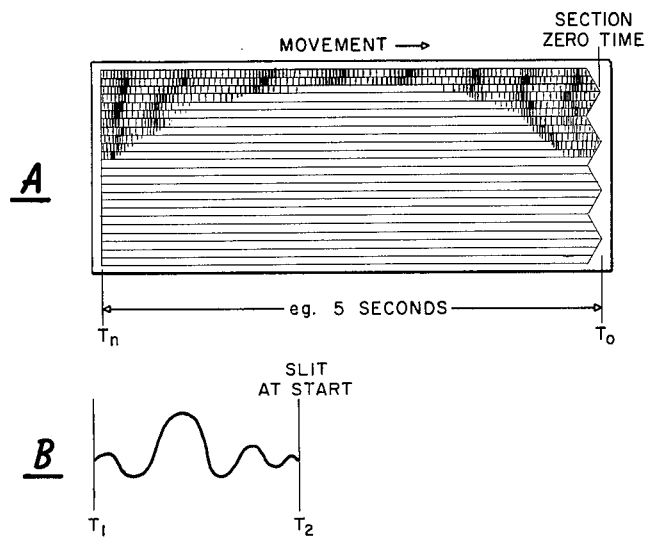
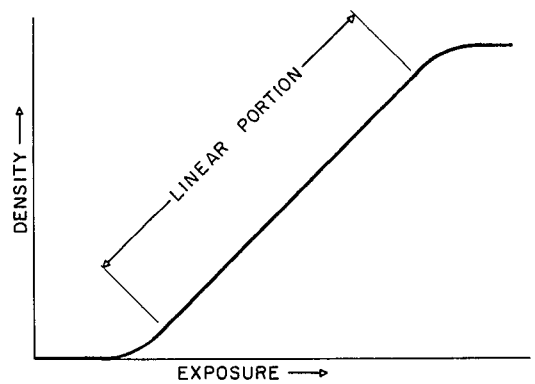
FIG. 3
FIG. 4
Walter H. Glazier
Harland H. Heffring
INVENTORS.
BY John D. Gassett
ATTORNEY.

United States Patent Office 3,254,835
Patented June 7, 1966

3,254,835
OPTICAL FILTER
Walter H. Glazier and Harland H. Heffring, Calgary, Alberta, Canada, assignors, by mesne assignments, to Esso Production Research Company, Houston, Tex., a corporation of Delaware
Filed Dec. 19, 1963, Ser. No. 331,655
7 Claims. (Cl. 235—61)

This invention relates to the art of filtering. It relates especially to the art of optical filtering. It is more specially concerned with optical filtering of seismic signals.

The method commonly employed for searching for petroleum or other mineral deposits is that known as seismic prospecting wherein a seismic distrubance is initiated at a selected point in or near the earth's surface to direct seismic waves downwardly into the earth from that point. The waves continue to travel downwardly within the earth until they encounter discontinuities in the earth's structure and compositions in the form of various substrata formations and the like. These discontinuities have the effect of reflecting a portion of the seismic waves back toward the surface of the earth. Sensitive pickups or transducers, sometimes called geophones, seismic detectors, or seismometers, are arranged at a plurality of points along the earth to translate the detected earth motion into electrical impulses which, after suitable amplification, are recorded. The signal recorded then is usually indicative of the character of the ground motion and of the position of the reflecting beds and are usually referred to collectively as a seismic signal which is, in effect, a composite signal made up of a plurality of electrical signals varying in frequency and amplitude. The electrical signals oscillate about a no signal zero voltage or quiescent record base line. The seismic signal thus detected and recorded is then processed and displayed in various ways.

The recorded reflections are usually spaced so closely together and the reflection patterns from a number of discontinuities are superimposed to the extent that they are sometimes nearly hidden in the composite seismic signals originally recorded. Such a complex signal is most difficult to interpret. Therefore, various procedures have been tried and used with some success to improve the usefulness of the seismic signal which has been recorded. Some of the procedures which have been tried include filters, different ways of arranging the individual geophones within an array of geophones, etc. These techniques have greatly improved the usefulness of data obtained from seismic records. One of the most useful of these procedures is the use of filters which ordinarily are of the electronic variety. These electronic filters are useful in convolving one function with another. The usefulness of such electronic filters is usually at least partially offset by the high cost of processing.

The present invention is concerned with an optical filtering system. In a preferred embodiment of this invention, the first function $f_1(t)$, i.e., a seismic section, is displayed as a variable density time function and is optically convolved by a second function $f_2(t)$. A seismic section is a plurality of side-by-side seismic signals arranged to give a representation of a cross section of the earth through the points where the seismic signals were detected. Variable density normally means the display of a signal such as a seismic signal in a manner such that the intensity of the display is a function of the amplitude of the seismic signal. Each signal of the seismic section is usually displayed in a straight channel of uniform width within the variable density seismic section. Briefly in a preferred embodiment a contact print is made from such a variable density section on film. The variable density section is moved for a time equivalent to the selected duration of the filter function $f_2(t)$, at a uniform rate over a recording medium which is kept stationary with respect to variable density seismic section. During this movement, the entire film of the density section is exposed by a light source which is modulated by the second function $f_2(t)$, e.g., the impulse response of the desired filter. As will be seen, the exposure of the recording medium is a convolution of the seismic section and the filter function.

Various objects and a complete understanding of the invention can be had from the following description taken in conjunction with the drawings in which:

FIG. 1 illustrates a preferred embodiment upon which the invention may be practiced;

FIG. 2 is an exploded view of the portion of that apparatus of FIG. 1 which is useful in obtaining the filtering function;

FIG. 3 illustrates one form of $f_1(t)$ and $f_2(t)$; and,

FIG. 4 ilustrates a curve of nonlinear photographic-film.

One desired operation of this invention is to have a first-function such as $f_1(t)$ filtered by the second function $f_2(t)$. This can also be expressed as a convolution as in Equation 1.

(1) $$f_1(t) * f_2(t)$$

Mathematically, this can also be expressed as Equation 2 which is the convolution integral.

(2) $$\int_{-\infty}^{+\infty} f_2(t-x) f_1(x) dx$$

As will be explained in more detail hereinafter, cross correlation or autocorrelation can also be performed with this system. However, the use of the apparatus for convolving a variable density seismic section with the impulse response of a desired or selected filter will be considered first.

Attention is now directed toward FIG. 1 which illustrates the best mode contemplated for carrying out this invention. Shown thereon are two major sections: (a) the recording section including the seismic section, the unexposed recording medium and the exposure light means, and (b) means for generating the filter function for modulating the exposure light means. Attention will first be directed toward the recording portion of the apparatus. Shown thereon is a first shaft 10 which is supported from frame 12 at each end and a second shaft 14 which is likewise supported from frame 12. Shaft 10 has mounted thereon and fixed thereto a first drum 16 and second drum 18. Shaft 14 has a first drum 20 and a second drum 22. A first belt 24 is supported from drums 16 and 20. A second belt 26 is supported from drums 18 and 22. Belts 24 and 26 are parallel to each other and move in unison. A frame 28 for holding the recording medium or film is connected or secured to frame 12 by bolts 30 or the like. Recording film 32 is supported by frame 28 in a conventional manner such as by tape, friction, clamps, etc.

Supported from belts 24 and 26 and immediately above film 32 is a seismic section holder 34 which has mounted thereon a seismic section 36 also in a conventional manner. Seismic section holder 34 has an opaque outer section and a transparent rectangular inner section 38 upon which the seismic section film is placed. Variable density seismic section 36 occupies all of the transparent area 38 of the holder 34. If the seismic section does not cover all of the transparent area, then the area not covered is otherwise blocked or blanked out as by some opaque tape or material. Seismic section 36 should be as close as possible to the film 32 so that a contact-like print can be made on film 32 of the section 36. In operation, the recording film 32 remains stationary while the seismic section 36 slides or moves across the top thereof.

Means are provided for directing light from exposure light 40 through divergent lens 42 so that uniform light is directed on film section 36. Exposure light 40 is modulated by a modulator means 44 which can be an amplifier responsive to an input signal.

Attention will now be directed toward that part of the apparatus shown in FIG. 1 used for obtaining the proper modulation of the light source 40. Shown on shaft 10 is a second pair of drums 46 and 48. Also mounted on shaft 14 is a first drum 50 and a second drum 51. Mounted on drums 46 and 50 is a belt 52 and mounted on durms 48 and 51 is belt 54. Belts 52 and 54 are parallel and move in unison upon the rotation of shaft 10.

Supported from and above the bottom of frame 12 is a light source 58. Mounted above light source 58 and supported from belts 52 and 54 is a support means 56. Support means 56 is transparent. Mounted on support means 56 is a plurality of frequency components 60a to 60n; each component is relatively narrow and is arranged parallel to the movement of belts 52 and 54. The frequency components are secured to support means 56 in a conventional manner as by tape, friction units, etc. There is a frequency component for each frequency of the filtering function $f_2(t)$. As an example, in seismic filtering the frequency range of interest is normally from about 20 cycles to about 60 cycles. In this example, then, there are 41 components. Each frequency component is conveniently of the variable density or variable area type. The type shown is the variable area in which the sine wave of each frequency is plotted on a transparent strip and the area under the curve is darkened to have a high density such as to block light. Thus, the amount of light passing through any lateral increment along the frequency component 60a is a function of the amplitude of the sine wave at that particular point. The darkened part is illustrated at 62 and the light or transparent portion at 64 as shown in FIG. 2. The boundary between the dark and light part takes the form of the sine wave. In this particular frequency component the maximum amplitude for each frequency component is unity. As will be seen, there are means provided for modulating this feature so that each frequency component can be weighted as desired. The frequency components are removable but when the machine is in operation they move as a unit with belts 52 and 54 to which support means 56 is connected.

Means are provided to adjust the phase and the relative amplitude of each frequency component 60a. Such means are supported by and above light source 58. Mounted on top of light source 58 and secured there are density wedges 66. Below each frequency component 60a to 60n is a density wedge 66 which varies from transparency at 68 to opaqueness at 70 as shown in FIG. 2. Each is adjustable longitudinally along the length of its associated frequency component 60a. Placed immediately above the density or light wedge 66 is a plurality of opaque longitudinal bars 72 having slits or transparent sections 74. There is a bar 72 for each frequency component. Each slit 74 is transverse to the frequency component and is of a length that is equal to the maximum amplitude or unity amplitude of the frequency component. The width of the slit is very small, for example, about .002 inch to .004 inch. Generally speaking, the slit is sufficiently narrow to approximate a delta function for the band width of interest but wide enough not to create impossible tolerances on the manufacture of the slits. These bars 72 are adjustable longitudinally and the position of the slit 74 through which the light can pass determines the phase of the frequency component with which it is associated. The intensity wedges 66 are also adjustable longitudinally so that the weight desired to be given a frequency component is represented by the density of the portion of the wedge under the slit 74. Thus by the position of slit bar 72 and the density wedge 66 the phase and the weight of each frequency component is individually adjusted. Once the phase and density or weight are adjusted, bar 72 and density wedges 66 are held in position by clamp bar 76 and nut means 80 and stud means 81 projecting upwardly from light means 58.

Light, which is directed through the various slits 74, is focused through focusing lens 80. The light thus focused by lens 80 is directed onto a pickup or photoelectric cell 82 whose output signal at any one instant is proportional to or representative of the total amount of light at that instant passing through the slits 74. The output of photocell 82 is passed through conductor 84 to modulating means 44 which modulates light source 40 in accordance with output photoelectric cell 82. Cover means not shown are provided such that only the light passing through slits 74 are focused by lens 80 and likewise so that only light passing through lens 42 is directed onto seismic section 36.

Shaft 10 is the power shaft and obtains its power from motor 86 through gear box 88. Shaft 14 is primarily a support shaft for the drum supporting the other end of the belts 24, 26, 52, and 54. Mounted on the external end of shaft 14 is a control index which includes an arm 92 connected to shaft 14 and an arc member 94 having a first contact 96 and a second contact 98. Contacts 96 and 98 are reversing micro-switches. The contacts 96 and 98 are connected to motor control 100 such that when arm 92 contacts 96, motor 86 is reversed and when the arm contacts or encounters contact 98, motor 86 is reversed again. The number of runs controls the exposure time. Power for control box 100 is provided through switch 93.

Having described the structural component of the embodiment of FIG. 1 and FIG. 2 attention will now be directed toward its operation. For example, let it be assumed that it is desired to optically filter a seismic section 36 which may be representative of five seconds in length. It will be understood that seismic sections are most frequently recorded in terms of time with the longitudinal dimension of each trace of the section. This is illustrated in FIG. 3 as curve A. The seismic section which is to be processed is placed on holder 34. The opaque part 38 of holder 34 is sized such that it coincides with the sides or limits of section 36. This is so that the only light passing through the transparent portion 38 to film 32 first passes through seismic section 36.

Let it be assumed that it is desired to filter a seismic section 36 by a second function $f_2(t)$ which, for example, is shown as curve B in FIG. 3 and is, for example, 100 milliseconds in duration. The frequency components 60a to 60n together with the positioning of slits 74 for each frequency component to adjust for phase and the density wedges 66 are adjusted to properly weight each frequency component. There are various ways of arriving at the proper frequency components and their phase and amplitude relationship to obtain the filter function. For example, if the filter function is given in the time domain as illustrated in curve B of FIG. 3 it can be readily transformed from the time domain into the frequency domain. This is easily accomplished by the use of Fourier's transform. When the filter function $f_2(t)$ is defined in the frequency domain, a frequency component ($60a$ to $60n$) is selected for each frequency component necessary to approximate the time domain signal $f_2(t)$. The slits 74 are moved independently to place each frequency component in the proper phase with relation to the other components. Normally, the frequency components will be arranged such as to all be zero or maximum at a beginning point such that when slits 74 are all aligned, the frequency components are in phase. The variable density wedges 66 are moved independently of the slits 74 to provide amplitude control for each frequency. It is thus seen that there are now the necessary frequency components provided with the proper amplitude and phase control. This then is seen to define the function $f_2(t)$ shown in curve B in FIG. 3. For convolution, $f_2(t)$ is produced from $t_2$ to $t_1$ by the function generating means shown as a part of FIG. 1.

Belt 52 is moved to a position such that the amount of light passing through slit 74 is equivalent to or corresponds to the time domain signal at the point $t_2$, curve B. Contacts 98 and 96 are preferably reversing microswitches. These are positioned to correspond to $t_1$ and $t_2$ of the filter function of FIG. 3. $t_2$ of function B, FIG. 3 is positioned on slit 74 so that arm 92 is in contact with one of the reversing switches. At this time, the apparatus is in condition to filter the function $f_2(t)$, that is, the seismic section 36, by the function $f_2(t)$. Switch 93 is closed, energizing the unit and starting the operation. Shaft 10 drives belts 24, 26, 62, and 54 in unison. As belt 52 moves, it moves holder 56 so that from the time $t_2$ to $t_1$ the function $f_2(t)$ is generated by the variations of the total light intensity passing through the slits. This light is collected by focusing lens 80 and focused on pickup device 82. The amount of light at any one instant between $t_2$ and $t_1$ has a total integrated value which is proportional to the amplitude of the signal $f_2(t)$ at that particular instant. This value of the intensity of the light passing through lens 80 is picked up by photocell 82 which controls modulator 44 so that the instantaneous light coming from light source 40 in any one instant is proportional to the amplitude value of the signal $f_2(t)$ at that particular time.

At the same time that signal $f_2(t)$ is generated by the movement of belt 52, belts 24 and 26 are also moving in direct proportion and are moving seismic section 36 along over film 32. During the time between $t_2$ and $t_1$ which is required to generate the signal $f_2(t)$, the film 36 has moved with relation to film 32 a similar distance of time of $t_2$ to $t_1$ which in this particular example is 100 milliseconds. Movement of the seismic section is indicated in FIG. 3. The first instant the light is turned on in this process, there is one image exposed onto film 32. That image is the image of seismic section 36 and the intensity of the image is proportional to the amplitude value of $f_2(t)$ at time $t_2$. At a time $\Delta t$ from $t_2$ there is a second image exposed onto film 32 which is the image of seismic section 36 displaced a distance $\Delta t$ from the first exposure. This image is modulated by or as a function of signal $f_2(t)$ at the time $\Delta t$ from $t_2$ toward $t_1$. As each such image of section 36 is superimposed on film 32, the exposure of the film 32 is a summation of all of the exposures of section 36 as it is displaced from drum 20 toward drum 16 a distance $\Delta t$ or $t_2$ to $t_1$. Each exposure is modulated by the instantaneous value of the signal $f_2(t)$ at the time corresponding to the displacement of the film 36. What has just been described is in reality a convolution of $f_1(t)$ (seismic section 36) by the second function $f_2(t)$ as represented by curve B of FIG. 3.

When a reversing switch is contacted in the convoluting process, movement of the seismic section of FIG. 3 is reversed from that indicated and the function $f_2(t)$ shown as curve B is generated from $t_1$ to $t_2$. The reversing system is used if it is desired to reinforce the exposure of recording medium 32.

In a modification of this embodiment of the invention, the modulated signal or filter function can be obtained by various other ways. For example, the function $f_2(t)$ represented by curve B can be obtained from a function generator 102 which can be the function recorded in magnetic form on a recording medium, for example. Switch 104 can be placed on its number 2 position and the signal reproduced and passed to the modulator 44 to modulate light source 40. When this is done, the scale or time of the signal $f_2(t)$ $t_2$ to $t_1$ is to be the same scale, time-wise, or proportional to that of the section being filtered.

As another alternative, the impulse response, or $f_2(t)$ can be obtained or generated by scanning a filter function with a single slit, that is, only one slit 74 held stationary would be used, the others would be blocked off. In this alternative, the density wedges 66 are removed and the frequency component is replaced by a density section already in variable density form or variable area representing the function $f_2(t)$. This is the same scale as the section 36 being filtered. This variable density function $f_2(t)$ is moved past the stationary slit.

This invention can also be used for cross correlation of any one trace with one or any number of traces of a section. When the device is used for this system, the trace and the section are in the same scale. The slits 74 are all aligned and held stationary above light source 58. Frequency components 60a to 60n are moved from one end to the other or from $t_1$ to $t_2$. Function B, FIG. 3, is reversed in time for correlation from that used in convolution. In other words it is generated from $t_1$ to $t_2$. This amount of light passing through slit 74 is used to modulate the light source 40 which exposes the trace or traces of film section 36 with which the cross correlation is being made. The section 36 in this instance is moved a distance over film 32 which is equivalent to the time $t_1$ to $t_2$ of the trace with which the correlation is being made.

In autocorrelation, the selected trace is used for $f_2(t)$ and another copy of the same trace is placed above film 32 in place of section 36. The operation is repeated similarly as for cross-correlation. That is, the selected trace is placed on top of light source 58 and moved across the slit from $t_1$ to $t_2$. The other copy of the trace is moved across film 32 for a similar displacement of $t_1$ to $t_2$. Of course, all of film 32 can be blocked off except that immediately under the trace being cross-correlated.

The use of this invention leads to many advantages in processing of seismic sections. For example, it permits rapid filtering of complete seismic sections with as little as one to two minutes or less per section. Also, as shown, cross-correlation of any one trace with all traces of a section can be made, or autocorrelation can be performed on individual traces. Also, any filter function can be generated which is extremely difficult, if not impossible, to build with standard passive circuit electronic components. Rapid cross-correlation which is permitted by this invention permits improved techniques for picking the most probable smoothing corrections to apply to variable density sections. This increased speed, or rather the reduced time involved, permits new ideas to be tried which have previously been prohibitive because the time involved and this is thus of an inestimable educational value.

A D.C. bias is a part and parcel of a variable density representation of a seismic time variant function. In seismic operations, data in the variable density form is usually recorded as positive and negative values at a displaced zero; thus, there is a constant value K added to the seismic function $f_1(t)$. That is, instead of being simply $f_1(t)$ it is actually $K+f_1(t)$ so that the function is always a positive value. So in the use of this system when a displaced zero has been used, as is normally done in variable density presentations of seismic signals, one has the term $K_1+f_1(t)$ and the term $K_2+f_2(t)$. When these are involved, the following convolution equation can be written.

(3)

$$[K_1+f_1(t)]*[K_2+f_2(t)] = \int_{t_1}^{T}[K_1+f_1(t)]\cdot[K_2+f_2(\tau-t)]dt$$

$$= \underbrace{\int_{t_1}^{T}K_1K_2 dt}_{(1)} + \underbrace{\int_{t_1}^{T}f_1(t)f_2(\tau-t)dt}_{(2)} + \underbrace{\int_{t_1}^{T}K_1f_2(\tau-t)dt}_{(3)}$$

$$+ \underbrace{\int_{t_1}^{T}K_2f_1(t)dt}_{(4)}$$

The convolution when multipled out as shown has four separate integrals. The second integral contains information which is of the most importance. By observing certain techniques, the integrals 1, 3, and 4 can be made to contribute practically nothing to the final output. Integrals 3 and 4 can be made nearly equal to zero if the photo representation of $f_1(t)$ and $f_2(t)$ are free from distortions introduced by the photographic process.

For example, it has been found effective to have the positive of these functions which are used in the operation of the system made in such a way that the gamma product of the negative and positive is equal to one. Thus, the positive is proportional to the exposing light. If other precautions are taken such as making sure that the densities on the negative from which the positive is made follow the linear portion of the gamma curve, the exposing light is proportional to the time variant functions, then integrals 3 and 4 can be considered as almost going to zero. In a suitable practice of this invention these negatives have been developed to a gamma of one and the positive from these negatives is developed from a gamma of one. By gamma curve, it is meant the slope of the exposure density curve.

It is usually desirable to remove or reduce the effect of the first integral in Equation 3;

$$\int_{t_1}^{T} K_1 K_2 dt$$

This can effectively be done by the judicious selection of the density exposure function of the film or recording medium 32. The terms $K_1$ and $K_2$ represent a constant background level in a variable density expression of the desired function. One method for removing this background is the use of a nonlinear photographic film. Such a film is of a photographic material such as to have a curve such as shown in FIG. 4 whose ordinate is density of the film and the abscissa is intensity of exposure. By controlling the exposure so that the constant $K_1 K_2$ is suppressed by the nonlinear insensitive region of the film, the desired function is printed in the essentially linear region of the film. It is thus seen that integrals 1, 3, and 4 of Equation 3 can be largely eliminated leaving only the desired integral 2.

It will be apparent to persons skilled in the art that many modifications of this invention are possible without departing from the spirit or scope thereof. Therefore, it is intended that the invention not be limited to the specific examples presented. It is therefore desired that only such limitations be imposed on the appended claims as are stated therein.

What is claimed is:

1. An apparatus for processing a first function and a second function, said first function being produced on a record means whose light transmissibility is a function of the first function, which comprises in combination:
   means for holding an unexposed photosensitive recording medium adjacent said record means;
   means to move said record means with respect to said unexposed recording medium;
   a light means for directing light through the entirety of said record means onto said recording medium to expose said recording medium;
   modulating means for controlling the intensity of the light from said light means in accordance with said second function.

2. An apparatus for obtaining the convolution of a first function by a second function which comprises:
   a record means having light transmissibility as a function of said first function;
   a recording medium;
   driving means to move said record means relative to and adjacent said recording medium;
   a first light source directing light toward said record means;
   parallel frequency components representative of selected frequencies of said second function, each said component having its light transmissibility varied along its length as a function of the sine wave of the frequency it represents;
   a frame for holding said frequency components;
   a second light source for directing light toward said frequency components on said frame;
   light sensitive means on a side of said components opposite said second light source for picking up light from said second light source as transmitted through said frequency components;
   modulating means modulating said first light source as a function of said light sensitive means;
   limiting means limiting the light transmitted for each frequency component to a line segment;
   means to individually vary the intensity of each line segment; and
   second driving means to move frequency component with respect to the line segment longitudinally and at a rate proportional to the movement of said driving means.

3. An apparatus as defined in claim 2 including means to control the movement of said record means with respect to the recording medium proportional to the second driving means.

4. An apparatus for processing a seismic section by a filter function having known frequencies which comprises:
   a recording medium;
   first driving means to move a seismic section adjacent to and with relation to said recording medium;
   frequency components including a variable area sine wave presentation for each frequency of interest of the filter function, said sine waves arranged in a side-by-side parallel relationship;
   a light shield means placed adjacent said frequency components and having individual slits for the transmission of light therethrough, said slits being the approximate width of the frequency components and perpendicular thereto, such light shield means including means to adjust the position of slits with respect to each other along the length of the individual frequency components;
   a variable density wedge means mounted adjacent each said slit, including means to adjust the portion of the wedge over said slit to a selected density;
   second driving means to move in unison the frequency components in relation to said variable density wedge and said light shield means and at a movement proportional to the movement of the seismic section by said first driving means;
   a first light means for directing light toward said seismic section.
   a second light means placed on one side of said frequency component and for directing light thereto;
   a light-sensitive means placed on the opposite side of said frequency component and said variable density wedge and said light shield means from said second light means;
   means to modulate said first light means in accordance with the output of said light-sensitive means as said second driving means moves the said frequency components along the light shield means and variable density wedge.

5. An apparatus as defined in claim 4 including means to limit the relative movement to a selected distance.

6. A method of obtaining the convolution of a seismic section upon a photosensitive recording medium with a filter function which comprises:
   moving the seismic section parallel to and closely adjacent said recording medium;
   directing a light onto said seismic section to direct an image of the entire seismic section onto said recording medium;

generating the filter function to the same scale as the seismic section; and simultaneous with the movement of said seismic section, modulating the light according to the second function thus generated.

7. A process for correlating a first seismic record of a duration interval of $t_o$ to $t_n$ with a second seismic record of a duration interval of $t_o$ to $t_n$, each said seismic record having its light transmissibility therethrough a function of its respective signal which comprises:

moving said first seismic record adjacent a photosensitive recording medium;

directing a first light through the entirety of the first seismic record onto the photosensitive recording medium;

directing a second light through an incremental portion of said second seismic record;

moving the incremental portion of the second record through which the second light is directed at a rate proportional to the movement of said first seismic record, the incremental portion advancing in the same time-wise direction as the direction of movement of said first seismic record; and simultaneous with the movement of said first seismic record, modulating said first light in accordance with the amount of said second light passing through the incremental portion of said second record.

References Cited by the Examiner

UNITED STATES PATENTS

| | | | |
|---|---|---|---|
| 2,604,955 | 7/1952 | Hawkins | 235—61 X |
| 2,951,736 | 9/1960 | Black | 346—1 |
| 3,035,479 | 5/1962 | Baltosser et al. | 88—14 |
| 3,040,320 | 6/1962 | Ikard | 346—1 |
| 3,048,846 | 8/1962 | Martin | 346—1 |
| 3,068,361 | 12/1962 | Lannan | 250—217 |

FOREIGN PATENTS 1,113,868   4/1956   France.

LEO SMILOW, *Primary Examiner.*

W. F. BAUER, *Assistant Examiner.*